(12) United States Patent
Sakamoto et al.

(10) Patent No.: US 9,557,472 B2
(45) Date of Patent: Jan. 31, 2017

(54) LIGHT GUIDE MEMBER AND METHOD OF MANUFACTURING LIGHT GUIDE MEMBER

(71) Applicant: S.K.G. CO., LTD., Aichi (JP)

(72) Inventors: Mitsuhide Sakamoto, Aichi (JP); Hiroshi Nakashima, Aichi (JP); Eisuke Hatano, Ichinomiya (JP)

(73) Assignee: S.K.G. CO., LTD., Aichi (JP)

( * ) Notice: Subject to any disclaimer, the term of this patent is extended or adjusted under 35 U.S.C. 154(b) by 411 days.

(21) Appl. No.: 14/115,160

(22) PCT Filed: Apr. 23, 2013

(86) PCT No.: PCT/JP2013/061888
§ 371 (c)(1),
(2) Date: Nov. 1, 2013

(87) PCT Pub. No.: WO2014/097662
PCT Pub. Date: Jun. 26, 2014

(65) Prior Publication Data
US 2014/0177278 A1    Jun. 26, 2014

(30) Foreign Application Priority Data

Dec. 21, 2012    (JP) .................................. 2012-280277

(51) Int. Cl.
*F21V 8/00*    (2006.01)

(52) U.S. Cl.
CPC ........... *G02B 6/0065* (2013.01); *G02B 6/0036* (2013.01); *G02B 6/0038* (2013.01)

(58) Field of Classification Search
CPC .... G02B 6/0036; G02B 6/0038; G02B 6/0065
See application file for complete search history.

(56) References Cited

U.S. PATENT DOCUMENTS

| 5,841,596 A | 11/1998 | Perlo et al. |
| 2011/0188830 A1 | 8/2011 | Isago et al. |

FOREIGN PATENT DOCUMENTS

| CN | 201945708 | 8/2011 |
| JP | 9-236802 | 9/1997 |
| JP | 2001-350008 | 12/2001 |
| JP | 2006-40616 | 2/2006 |
| JP | 2010-103068 | 5/2010 |

(Continued)

OTHER PUBLICATIONS

International Search Report, mail date is Jul. 9, 2013.

(Continued)

*Primary Examiner* — Thomas M Sember
(74) *Attorney, Agent, or Firm* — Greenblum & Bernstein, P.L.C.

(57) ABSTRACT

To provide a light guide member such that more uniform brightness can be ensured in a wide region. A light guide member according to the present invention that receives light through side surfaces and outputs the light through main surfaces includes recesses formed by a machine in at least one of the main surfaces in a groove-like or dot-like shape, the recesses having bottom surfaces formed of molten material at the deepest part of the recesses. Thus, there can be provided the light guide member that has the groove-like or dot-like recesses with the bottom surfaces formed by a molten mark and that can output light with more uniform brightness through the main surfaces when a wide region is observed.

17 Claims, 14 Drawing Sheets

(56) References Cited

FOREIGN PATENT DOCUMENTS

| | | |
|---|---|---|
| JP | 2011-159510 | 8/2011 |
| JP | 2012-9160 | 1/2012 |
| TW | 200540511 | 12/2005 |
| TW | 201018962 | 5/2010 |
| TW | 201122583 | 7/2011 |
| WO | 2005-090855 | 9/2005 |

OTHER PUBLICATIONS

First China Official Action, dated Sep. 17, 2015.
First Taiwan Official Action, dated Feb. 10, 2015.
First Japan Official Action, dated Jun. 24, 2014.

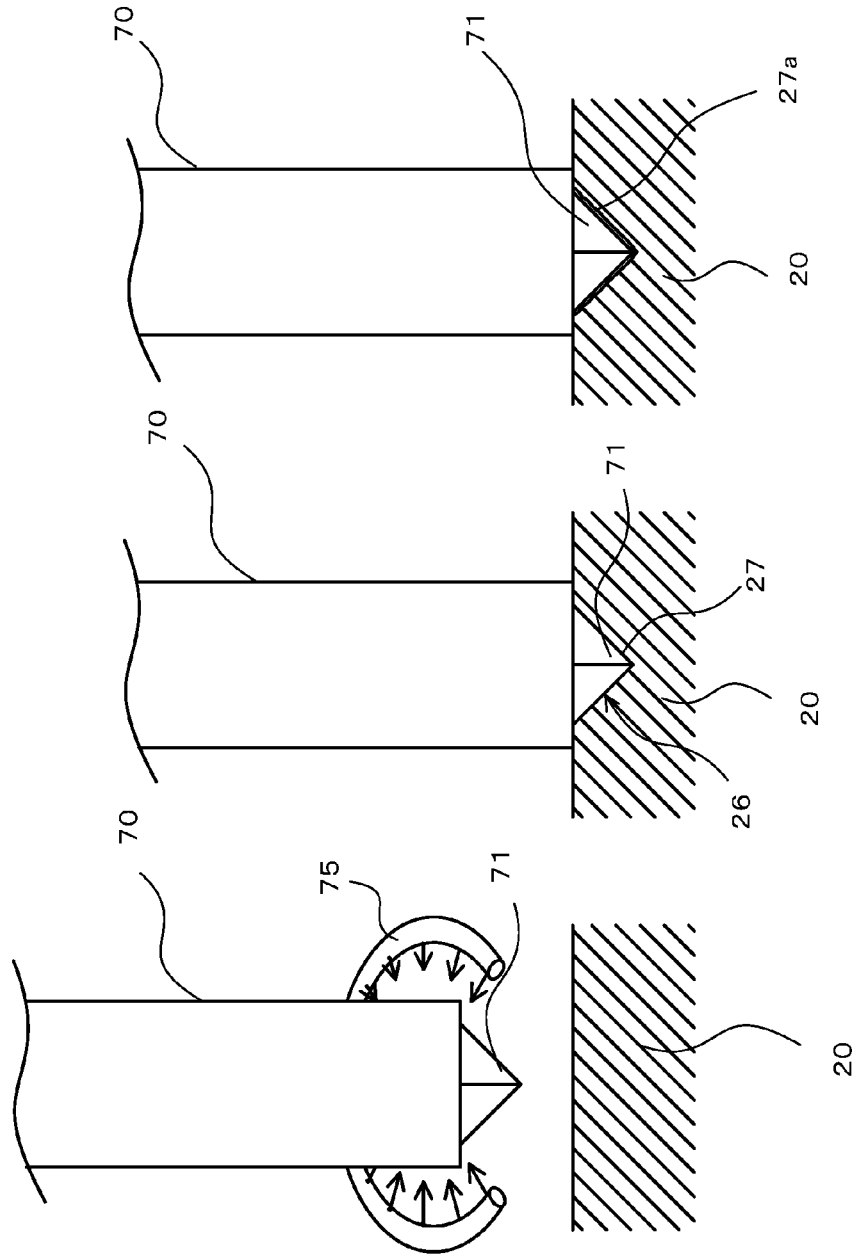

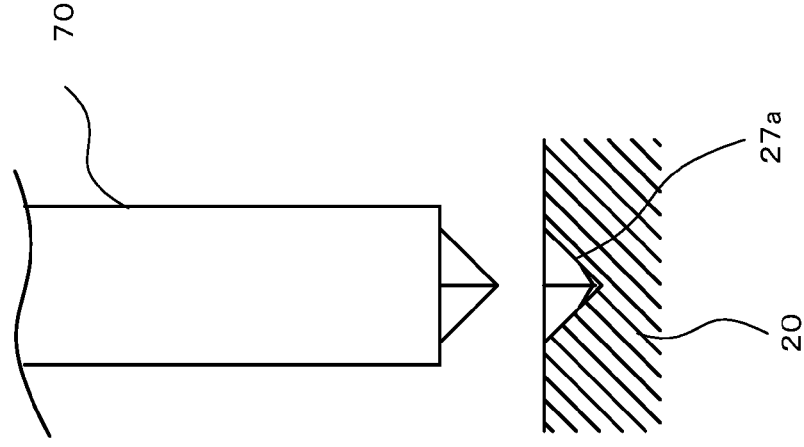
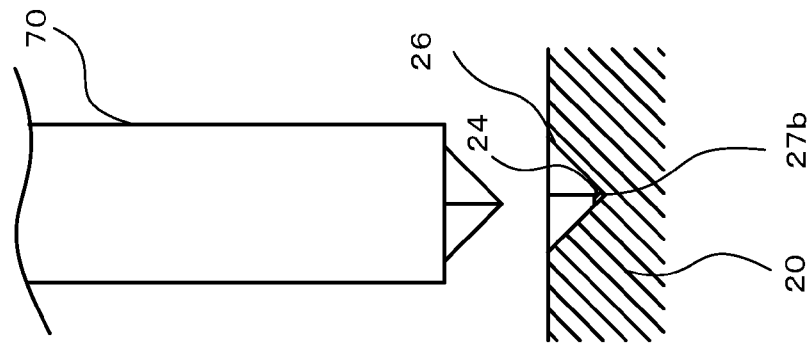

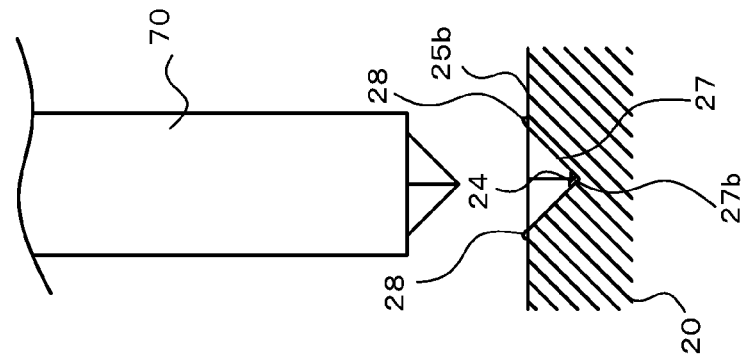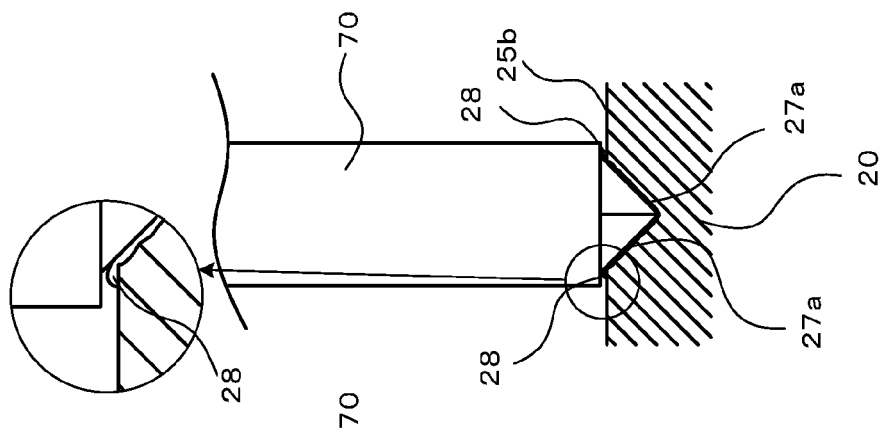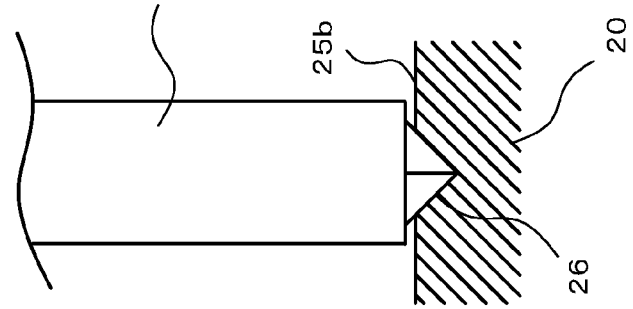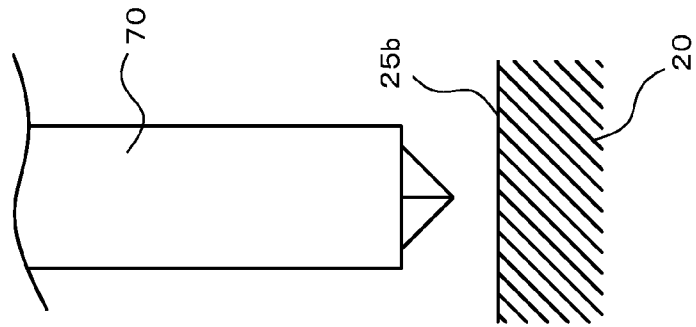

LIGHT GUIDE MEMBER AND METHOD OF MANUFACTURING LIGHT GUIDE MEMBER

FIELD OF INVENTION

The present invention relates to a light guide member and a method of manufacturing a light guide member.

BACKGROUND OF THE INVENTION

As a light guide member that receives light through one or more side surfaces thereof and that guides the light out through one or more main surfaces, a configuration with dot-like recesses or groove-like recesses in the main surfaces as a means for diffusing the light toward the main surfaces has been often proposed (see Patent Document 1, for example).

However, light guide plates with dot-like recesses or groove-like recesses have the problem that, although brightness can be ensured in a small area in the vicinity of each recess, sufficient brightness of light cannot be ensured in a relatively wide region around each recess.

PRIOR ART DOCUMENT

Patent Document

Patent Document 1: JP-A1-2005/090855

SUMMARY OF THE INVENTION

One of the objects of the present invention provides a light guide member in which, by improving diffusion efficiency, brightness of light can be ensured in a wide region around a recess.

In order to achieve the object above, the present invention provides the following light guide member.

A light guide member according to the present invention is a light guide member that receives light through one or more side surfaces and outputs the light through one or more main surfaces. In at least one of the main surfaces, a recess is formed by a machined mark in a groove-like or dot-like shape. A molten mark is formed in at least a part of the recess by the curing of a molten material.

The light guide member according to the present invention has a molten mark formed by a molten material in a part of the recess formed as a means for diffusing the input light toward the main surfaces. The molten mark has a different surface state from a bottom surface or side surface of the recess, so that the light that is diffused by the molten mark exhibits a different diffusion state from the bottom surface or side surface of the recess prior to the formation of the molten mark. Further, a boundary surface is formed with the bottom surface or side surface of the recess prior to the formation of the molten mark, so that the light can be further differently refracted or diffused by the boundary portion. Thus, the diffusion by the side surface or bottom surface of the recess and the diffusion by the molten mark are combined, so that high brightness of light can be ensured in a relatively wide region around the recess.

In the light guide member according to the present invention, the molten mark may form a bottom surface of the recess. By forming the bottom surface of the recess with molten material, the bottom surface of molten material formed in the recess is formed with different slopes from the recess side surface. Thus, the light diffused by the bottom surface of molten material exhibits a different diffusion state from the light diffused by the recess side surface. Further, the bottom surface is made by causing molten material to flow into the groove-like or dot-like machined mark (recess), so that a boundary is formed between the recess side surface and the molten material. Accordingly, the light is also diffused by the boundary. In this way, the diffusion and refraction by the boundary between the recess side surface and the bottom surface is combined with the diffusion by the surface of the bottom surface, whereby brightness of light can be ensured in a relatively wide region around the recess. Further, the bottom surface has a different diffusion state from the recess side surface, so that by changing the size or shape of the bottom surface, different impressions of light can be obtained, or the output efficiency of light through the output surface can be improved. Thus, the brightness of light can be varied in a relatively wide region around the recess, or the relatively wide region around the recess available to ensure brightness of light can be modified.

In the light guide member according to the present invention, the molten mark may be an uneven surface or a coarse surface. By forming the molten mark with an uneven surface or a coarse surface, an optical diffusion state different from the recess side surface formed in a relatively flat surface can be obtained.

Further, in the light guide member according to the present invention, the molten mark may have an area of not more than ⅕ the area of an opening portion of the recess on the main surface of the light guide member. In order to ensure brightness of light in a relatively wide region around the recess using an optical diffusion state of the bottom surface which is different from the recess side surface to the extent that visibility due to the diffusion of light by the recess side surface is not obstructed, the molten mark preferably has the area of not more than ⅕ with respect to the area of the opening portion of the recess on the main surface of the light guide member.

In the light guide member according to the present invention, the molten mark may be formed of the molten material melted from the light guide member generated when the recess is formed. The molten mark is formed not by pouring a molten material into the recess after being formed, but by flowing back the molten material of the light guide member per se that has existed in the recess portion and is generated when machining the groove-like or dot-like recess. In this way, the bottom surface can be made at the same time that the recess is formed without requiring a separate step of pouring a molten material so as to form the molten mark separately.

In the light guide member according to the present invention, the recess may have a substantially triangular frustum shape, a substantially circular frustum shape, or a substantially rectangular frustum shape with the bottom surface formed by the molten mark made by being flowed back at a bottom portion of a substantially triangular pyramid, a substantial cone, or a substantially square pyramid. In this way, by flowing a melted part of the light guide member back to the deepest part, i.e., in the direction of the apex, of the substantially triangular pyramid, substantial cone, or substantially rectangular pyramid, the bottom surface is formed near the apex. In the bottom surface made in this manner, a boundary is formed between the side surface of the triangular pyramid prior to the flowing-back and the flowed portion. Thus, in addition to the diffusion by the surface of the bottom surface, optical diffusion by the boundary also occurs. Accordingly, compared with the triangular pyramidal, conical, or square pyramidal recess, more complex optical diffusion takes place, so that different impressions of light can be obtained, or the output efficiency of light through the output surface can be improved.

Further, in the light guide member according to the present invention, the recess may be formed by melting the main surface by pressing a mold for ultrasound machining or thermal machining having an inverted shape with respect to the shape of the recess onto the main surface; and the bottom surface may be formed by flowing some of the molten material melted from the main surface back into the deepest part of the recess. The molten material is one provided when the molten mark is made by ultrasound machining or melting. In this way, the bottom surface can be readily made from the molten mark.

Further, in the light guide member according to the present invention, a protruding portion may be formed to be raised from the main surface in the vicinity of the periphery of the recess. In this way, irregular reflection is also caused by the protruding portion and therefore complex optical diffusion and refraction are caused, whereby different impressions of light can be obtained, or the output efficiency of light through the output surface can be improved.

Further, in the light guide member according to the present invention, the recess may be formed by melting the main surface by pressing a mold for ultrasound machining or thermal machining having an inverted shape with respect to the shape of the recess onto the main surface; the bottom surface may be formed by flowing some of the molten material melted from the main surface back into the deepest part of the recess; and the protruding portion may be formed by pushing out some of the molten material onto the periphery of the recess. Namely, the bottom surface is made by utilizing some of the molten material obtained by ultrasound machining or melting as it is, i.e., by flowing some of the molten material back, and the protruding portion is similarly made by utilizing some of the molten material obtained by ultrasound machining or melting as it is. In this way, the bottom surface can be readily made by flowing back the molten material, and the protruding portion can be readily made from the molten material.

Further, in the light guide member according to the present invention, the protruding portion may be formed by using a mold. In this way, a desired arbitrary shape of the protruding portion can be obtained. Thus, by changing the size or shape of the protruding portion, different impressions of light can be obtained, or the output efficiency of light through the output surface can be improved, whereby the brightness of light can be changed in a relatively wide region around the recess, or the relatively wide region around the recess available to ensure brightness of light can be modified.

Further, in the light guide member according to the present invention, the protruding portion may have a plurality of internal cracks. In this way, complex diffusion and reflection can be generated by the cracks, so that brightness can be ensured in a relatively wide region around the recess.

Further, in the light guide member according to the present invention, the protruding portion may have internal air bubbles. In this way, complex diffusion and reflection can be generated by the air bubbles, so that brightness can be ensured in a relatively wide region around the recess.

Further, in the light guide member according to the present invention, the mold may have an uneven shape on the surface of a convex portion inverted with respect to the shape of the recess; the recess may have a side surface with an uneven shape transferred from the uneven shape on the surface of the convex portion of the mold. By also forming an uneven shape in the side surface of the recess, even more complex optical diffusion or refraction are generated by the recess side surface, so that different impressions of light can be obtained or the output efficiency of light through the output surface can be improved.

Further, in the light guide member according to the present invention, the mold may have a step-like uneven shape on the surface of the convex portion inverted with respect to the shape of the recess; the recess may have a side surface with an uneven shape transferred from the step-like uneven shape of the surface of the convex portion of the mold. Thus, a step-like uneven shape is formed on the recess side surface. Accordingly, even more complex optical diffusion and refraction can be generated by the recess side surface.

Further, in the light guide member according to the present invention, the mold may have a step-like concentrically rectangular uneven shape on the surface of the convex portion inverted with respect to the shape of the recess; the recess may have a side surface with an uneven shape transferred from the step-like concentrically rectangular uneven shape of the surface of the convex portion of the mold. Thus, a step-like uneven shape similar to the opening of the recess is formed on the recess side surface, so that even more complex optical diffusion and refraction can be generated by the recess side surface.

A method of manufacturing the light guide member according to the present invention includes the following steps of:
(1) manufacturing the recess shape by melting the main surface by pressing an ultrasound machining mold having an inverted shape with respect to the shape of the recess onto the main surface of the light guide member, and
(2) forming a bottom surface by allowing molten material to flow to an apex of the ultrasound machining mold so as to flow some of the molten material back, and then lifting the ultrasound machining mold after the bottom surface is formed by the curing of the molten material that has been flowed again.

In this way, the light guide member having a bottom surface can be manufactured by using an ultrasound machining apparatus.

Further, the method according to the present invention may further include a step of forming a protruding portion by pushing out the molten material onto the periphery of the recess at the same time of forming the bottom surface. In this way, the light guide member having a bottom surface and a protruding portion can be manufactured by using an ultrasound machining apparatus.

Effects of the Invention

In the light guide member according to the present invention, groove-like or dot-like recesses having a molten mark on a bottom surface or a side surface are formed. Thus, a light guide member in which brightness of light can be ensured in a wide region around the recess and that can output light with uniform illuminance through main surfaces can be provided.

BRIEF DESCRIPTION OF THE DRAWINGS

FIG. 4A schematically shows a process of forming the recess 26 in the light guide member 20 according to the first embodiment;

FIG. 4B schematically shows the process of forming the recess 26 in the light guide member 20 according to the first embodiment;

FIG. 4C schematically shows the process of forming the recess 26 in the light guide member 20 according to the first embodiment;

FIG. 5A schematically shows the process of forming the recess 26 in the light guide member 20 according to the first embodiment; FIG. 5B schematically shows the process of forming the recess 26 in the light guide member 20 according to the first embodiment;

FIG. 9A schematically shows a process of forming the recess 26 in the light guide member 20 according to the third embodiment;

FIG. 9B schematically shows the process of forming the recess 26 in the light guide member 20 according to the third embodiment;

FIG. 9C schematically shows the process of forming the recess 26 in the light guide member 20 according to the third embodiment;

FIG. 9D schematically shows the process of forming the recess 26 in the light guide member 20 according to the third embodiment;

DESCRIPTION OF PREFERRED EMBODIMENTS

Embodiments of the light guide member 20 according to the present invention will be described with reference to the drawings. The embodiments described in the following and the drawings illustrate some of the embodiments of the present invention by way of example and are not intended to limit the present invention, and modifications can be made without deviating from the scope of the present invention. Corresponding constituent elements are designated with identical or similar reference signs throughout the drawings. In the present specification, a "recess side surface" refers to a side surface of a recess prior to the formation of a molten mark. Specifically, the term refers to the regions 27 in FIG. 2, for example.

(First Embodiment)

Figure 1:
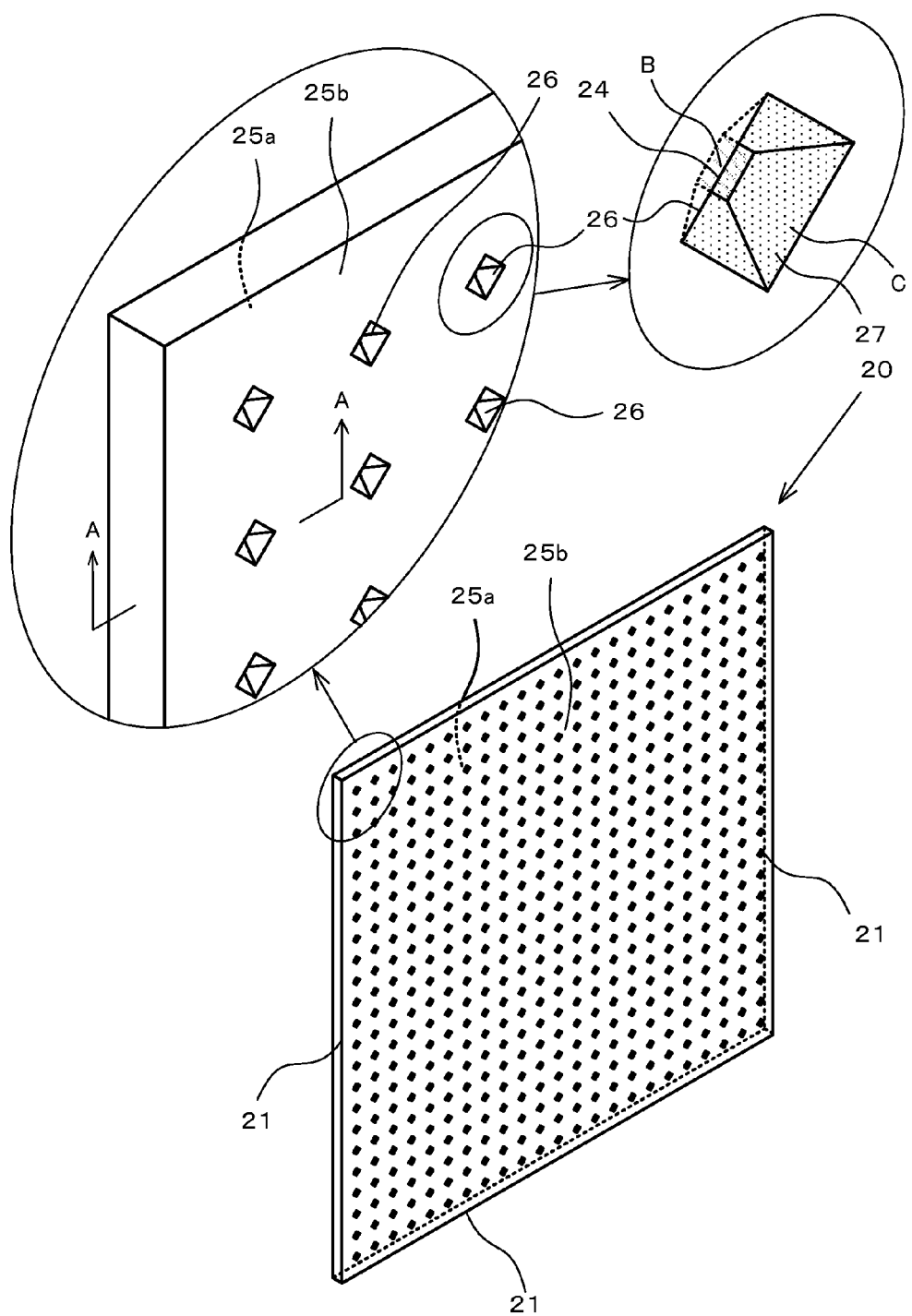
FIG. 1 shows a perspective view and partially enlarged perspective views of a light guide member 20 according to a first embodiment.
Figure 2:
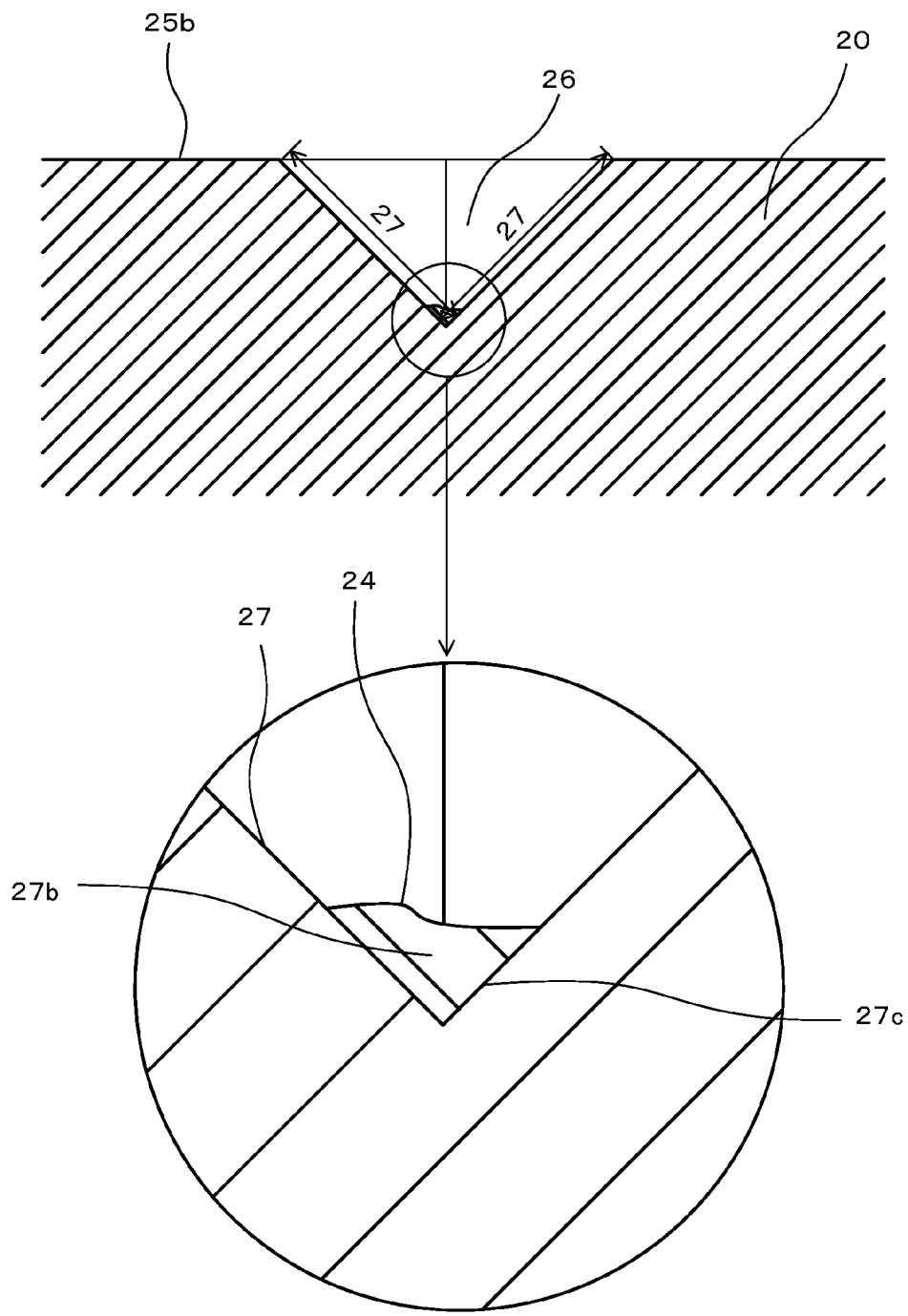
FIG. 2 schematically shows an A-A cross sectional view and its enlarged view of a recess 26 of the light guide member 20 according to the first embodiment.
Figure 3A:
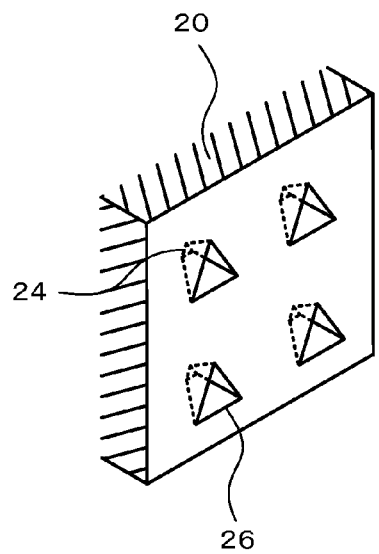
FIG. 3A shows a perspective view of variations of the recesses 26 formed in the light guide member 20 according to the first embodiment.
Figure 3B:
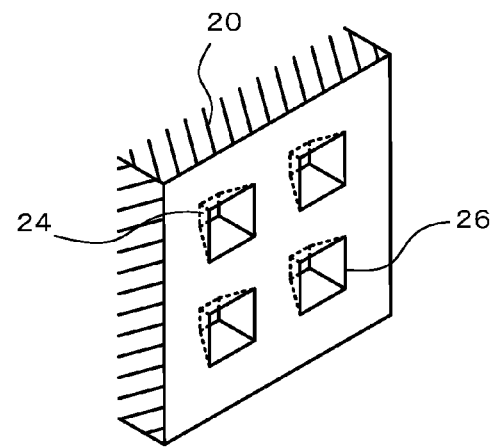
FIG. 3B shows a perspective view of variations of the recesses 26 formed in the light guide member 20 according to the first embodiment.
Figure 3C:
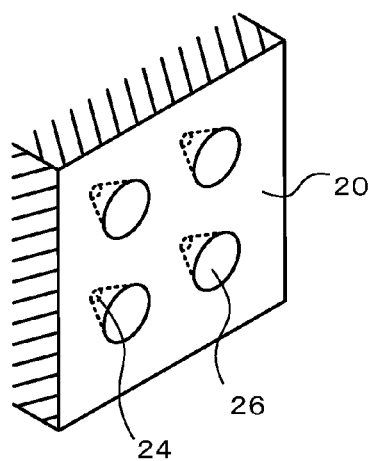
FIG. 3C shows a perspective view of variations of the recesses 26 formed in the light guide member 20 according to the first embodiment.
Figure 3D:
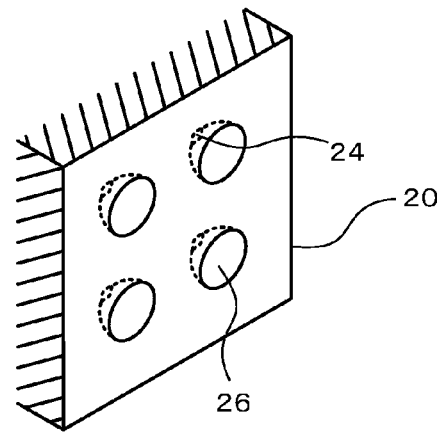
FIG. 3D shows a perspective view of variation of the recesses 26 formed in the light guide member 20 according to the first embodiment.

The light guide member 20 according to the first embodiment will be described in detail with reference to FIGS. 1 through 7. FIG. 1 shows a perspective view and partially enlarged perspective views of the light guide member 20 according to the first embodiment. FIG. 2 shows a cross section of a recess 26 formed in the light guide member 20.

The light guide member 20 according to the first embodiment is formed in a plate-like shape from a transparent resin that allows the passage of light. As shown in FIG. 1, dot-like or groove-like recesses 26 are formed in a main surface 25b on the opposite side to a main surface 25a on the light output surface. Thus, input light is diffused by the dot-like recesses 26 and then output mainly through the main surface 25a on the output surface. Examples of the material of the light guide member 20 are methacrylic resins such as methyl methacrylate or ethyl methacrylate, acrylic resins such as methylacrylate or ethylacrylate, and various transparent high polymer materials such as polycarbonate or polyethylene. The material may be semi-transparent or colored as long as the material is optically transmissive. The light guide member 20 may contain a fine particulate diffuser added to diffuse visible light. The thickness of the light guide member 20 in the case of using a plate-like shape is not particularly limited and may be on the order of 3.0 mm to 10.0 mm. According to the first embodiment, an 8.0 mm thick methacrylic resin with high transmittance is used.

The dot-like recesses 26 are formed such that, as shown in the partially enlarged view in FIG. 1 and in FIG. 2, the plane corresponding to the bottom surfaces of the square pyramids is located on the main surface 25b of the light guide member 20, with a molten mark formed at the apex of the square pyramid, i.e., at the deepest position. Thus, the dot-like recesses 26 have a substantially square frustum shape with a bottom surface 24 formed by the molten mark. The bottom surface 24 includes a surface with a different slope with respect to recess side surfaces 27. Preferably, the bottom surface 24 may have a surface form different from the recess side surfaces 27 so that the bottom surface 24 exhibits a different light diffusion state from the recess side surfaces 27. For example, when the recess side surfaces 27 are relatively smoothly formed, the bottom surface 24 is formed with an uneven surface or a coarse surface. By forming the bottom surface 24 differently from the recess side surfaces 27 with an uneven surface or a coarse surface, the bottom surface 24 exhibits a different light diffusion state from the recess side surfaces 27 of the square pyramid. Thus, the main surface 25a that diffuses light randomly and with uniform illuminance can be formed. When the bottom surface 24 is smoothly formed, the recess side surfaces 27 may be coarsely formed. This does not exclude that both the bottom surface 24 and the recess side surfaces 27 are smoothly or coarsely formed. It is desirable that the bottom surface 24 of the recess 26 has an area B such that the diffusion of light by the recess side surfaces 27 of the recesses 26 is not obstructed. Thus, the area B of the bottom surface 24 for the purpose of improving the light diffusing function may be preferably ⅕ an area C of an opening portion on the main surface 25b of the light guide member 20. More preferably, the area B may be ¹⁄₁₀ to ⅕ the area C. The individual dot-like recesses 26 may have the same size or different sizes. For example, as further away from a light source, the sides of the dot-like recesses 26 of square pyramidal shape may be gradually increased, or the depth of the dot-like recesses 26 of square frustum shape may be gradually increased. In this way, the amount of light that is diffused can be decreased at positions closer to the light source where the light is strong while the amount of light that is diffused can be increased as further away from the light source. Thus, the substantially uniform amount of light output from the main surface 25b can be obtained. According to the present embodiment, the sides of the dot-like recesses 26 have a length of approximately 0.6 mm and a depth of approximately 0.4 mm, and the pitch between the adjacent dot-like recesses 26 of square pyramidal shape is 2.0 mm. The size of the recesses is not particularly limited and an appropriate size may be arbitrarily selected. Preferably, the length of the sides of the dot-like recesses 26 of square pyramidal shape may be selected between 0.2 mm and 1.5 mm. The depth of the dot-like recesses 26 of square pyramidal shape may be selected between 0.4 mm and 0.8 mm. Also, the pitch between the adjacent dot-like recesses 26 of square frustum shape is not particularly limited, and may preferably be selected between 1.5 mm and 8.0 mm. Further preferably, the pitch may be selected from 1.5 mm to 3.0 mm. The dot-like recesses 26 may have various shapes as shown in FIG. 3 other than the rectangular frustum. For example, a triangular frustum (FIG. 3A), a square frustum (FIG. 3B), or a circular frustum (FIG. 3C) each with the bottom surface at the bottom portion of the hole, or the hemispherical recess 26 with the bottom surface 24 at the deepest part (FIG. 3D) can be selected. The shape of the recesses is not limited to the above examples and the recesses of various forms may be selected as long as the recesses are concave.

In a method of manufacturing the recesses 26, the locations for the recesses 26 are melted, and some of the molten material is flowed back in the recesses 26. Specifically, first, as shown in FIG. 4A, a mold 70 for ultrasound machining that has an inverted shape (convex rectangular pyramidal shape) with respect to the recess 26 (rectangular pyramidal shape) prior to the formation of the bottom surface is prepared. Around the mold 70, an air-cooling nozzle 75 for cooling the mold 70 by blowing cooling air is disposed. Thus, the mold 70 is cooled by the air-cooling nozzle 75 at all times. The air-cooling nozzle 75 is shown only in FIG. 4A and omitted in other drawing figures. Next, as shown in FIG. 4B, ultrasound is applied in the case of ultrasound machining while the mold 70 is pressed onto the light guide member 20. As the rectangular pyramidal convex portion 71 is pressed in while melting the light guide member 20, the recess 26 having the recess side surfaces 27 is formed in the light guide member 20. Then, as shown in FIG. 4C, the mold 70 is temporarily paused when pressed down to a predetermined position, or the pressing time is slightly extended, so as to melt the recess side surfaces 27 into molten material 27a. The molten material 27a flows, due to its fluidity, on the recess side surfaces 27 into the deepest part. Because the mold 70 is being cooled by the air-cooling nozzle 75, the molten material 27a that has flowed into the deepest part is cooled by the cooled mold 70. As a result, the molten material 27a is cured in the deepest part, forming the bottom surface 24 with the molten mark 27b. When the mold 70 is subsequently released from the light guide member 20, as shown in FIG. 5A, some of the molten material 27a is flowed back in the deepest part (apex of the rectangular pyramid) to form the molten mark 27b. Thus, the bottom surface 24 is formed by the molten mark 27b. On this occasion, as shown in FIG. 5B, the molten material 27a as it flows on the recess side surfaces 27 may be cooled so as to leave a molten mark at some portions of the side surfaces.

As shown in FIG. 2, in the light guide member 20 made as described above, the bottom surfaces 24 formed by the molten mark 27b are formed by the natural flow of molten material, and therefore the individual bottom surfaces 24 have subtly different shapes. Thus, the recesses 26 have different states of optical diffusion, reflection, and refraction. Accordingly, compared with the light guide member 20 with the dot-like or groove-like recesses 26 without the bottom surfaces 24, the light guide member 20 manufactured as described above can output light that is diffused by the bottom surfaces 24 of the recesses 26 in a complex manner, so that the light guide member 20 having the main surface 25a through which light with more uniform illuminance is emitted can be provided. Between the molten mark 27b forming the bottom surface 24 and the inner surface of the rectangular pyramidal recess 26, a boundary 27c is formed. The boundary 27c causes the light to be diffused, reflected, and refracted in an even more complex manner, thus enabling more diffused light to be emitted through the main surface 25a. Thus, the light guide member 20 having the main surface 25a through which light can be emitted with more uniform illuminance can be provided.

Figure 6:
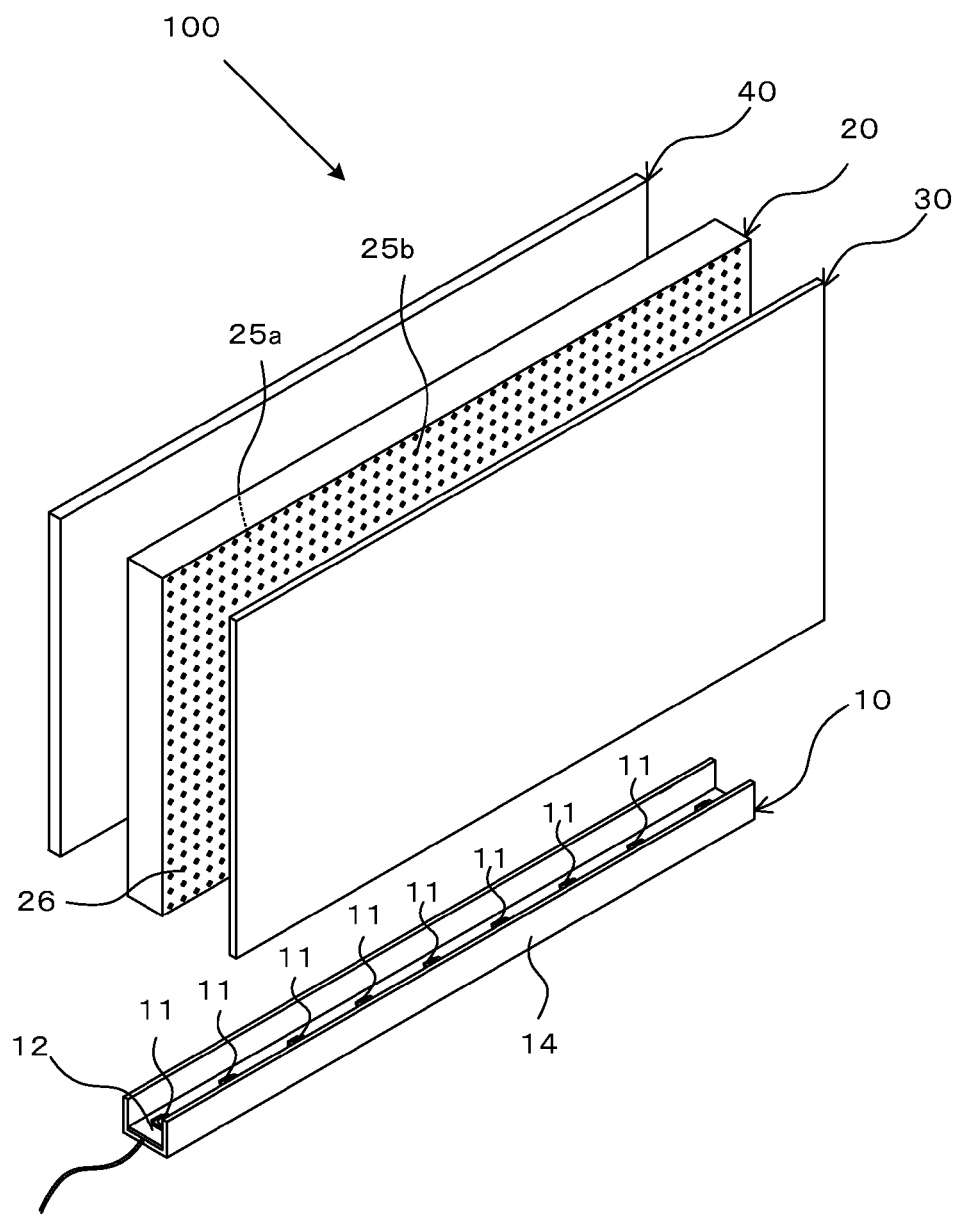
FIG. 6 is a perspective view of a display apparatus as a utilization example of the light guide member 20 according to the present invention.

The light guide member 20 made as described above can be used as a display apparatus 100 as shown in FIG. 6, for example, by attaching the light guide member 20 and a reflector 30 disposed on the rear surface of the light guide member 20 onto a holder member 14 to which a board 12 with light sources 11 is attached, and then installing a display plate 40 on the side of the main surface 25a which outputs light.

(Second Embodiment)

Figure 7:
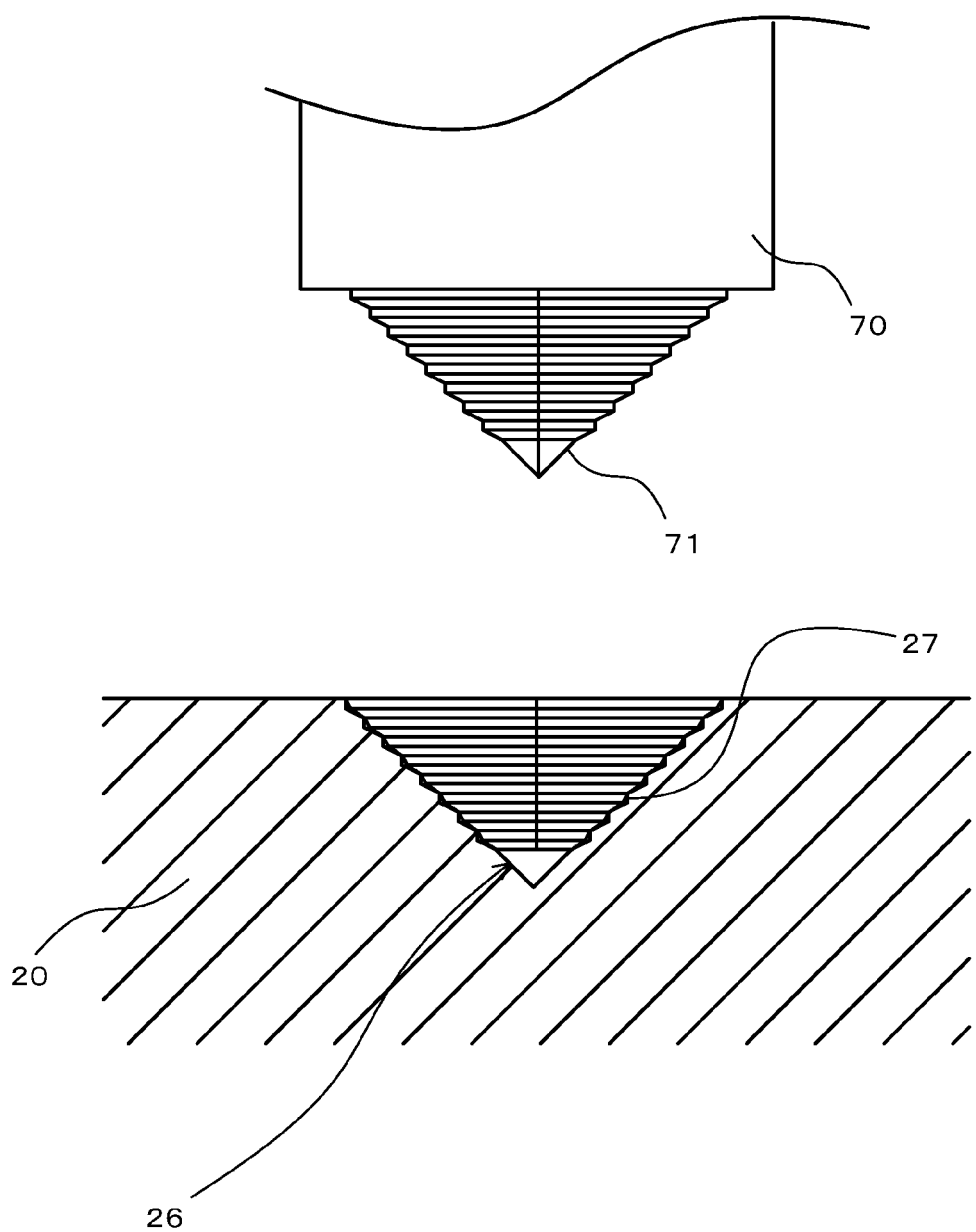
FIG. 7 is a side view of the recess in the light guide member 20 according to a second embodiment.

The light guide member 20 according to a second embodiment of the present invention will be described with reference to FIG. 7. FIG. 7 shows the dot-like recess 26 formed in the light guide member 20 and the mold 70 for manufacturing the recess 26 according to the second embodiment. The recess 26 according to the second embodiment has the recess side surfaces 27 that are intentionally formed with an uneven surface.

Figure 11:
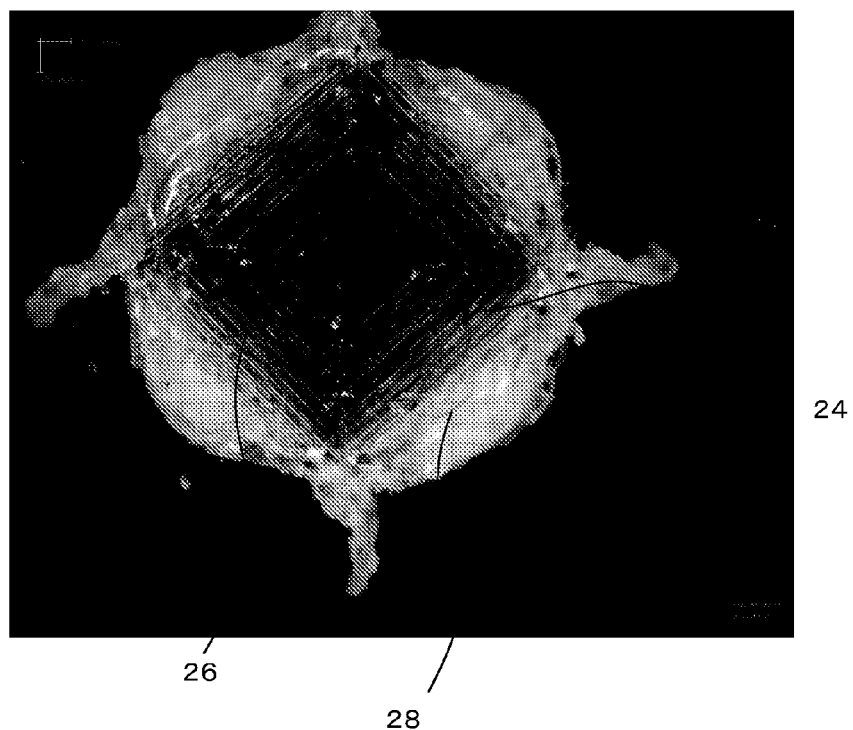
FIG. 11 shows a photograph of the recess in the light guide member 20 according to a fifth embodiment.

As shown in FIG. 7, in the recess 26 according to the second embodiment, the recess side surfaces 27 are formed in a step-like concentric rectangular step-like uneven shape (see FIG. 11, which also shows the concentric rectangular step-like uneven shape according to the fifth Embodiment. The uneven shape of the recess side surfaces 27 may be manufactured by using the mold 70 with the convex portion 71 provided in advance with an uneven shape which is inverted with respect to the desired uneven shape.

In practice, the obtained uneven shape may be more gradual than the shape of the convex portion 71 of the mold 70. This is due to the fact that, when the molten material formed on the recess side surfaces 27 flows into the bottom portion to form the bottom surface, the molten material may be collected and cured in the uneven recess side surfaces. By thus forming the recess side surfaces 27 of the recess 26 in uneven shape, light can also be diffused in a complex manner by the recess side surfaces 27. Thus, by modifying the uneven shape of the recess side surfaces, different impressions of light can be obtained or the output efficiency of light from the output surface can be increased. Accordingly, the brightness of light can be varied in a relatively wide region around the recess, or the relatively wide region around the recess available to ensure brightness of light can be modified.

While according to the second embodiment, the form of uneven shape is a step-like uneven shape, the form of uneven shape is not limited thereto and may include any shape as long as the shape is uneven. For example, the uneven shape includes a grained or pearskin finish. The uneven shape may be formed in a lattice shape, or a plurality of circular uneven shapes may be formed on the surface. Depending on the form of the uneven shape, different impressions of light can be obtained. These uneven shapes may be used in combination. For example, a relatively large lattice-like or circular uneven shape is formed, and then a relatively small grains or a pearskin is formed on the surface of the individual concavities and convexities of the uneven shape. By thus using a small uneven shape such as a pearskin in combination with a large uneven shape, light can be diffused by the respective uneven shapes so that more complex optical diffusion can be generated. The shape of the uneven shape is not limited, and uneven shapes of any size or form may be combined.

(Third Embodiment)

Figure 8:
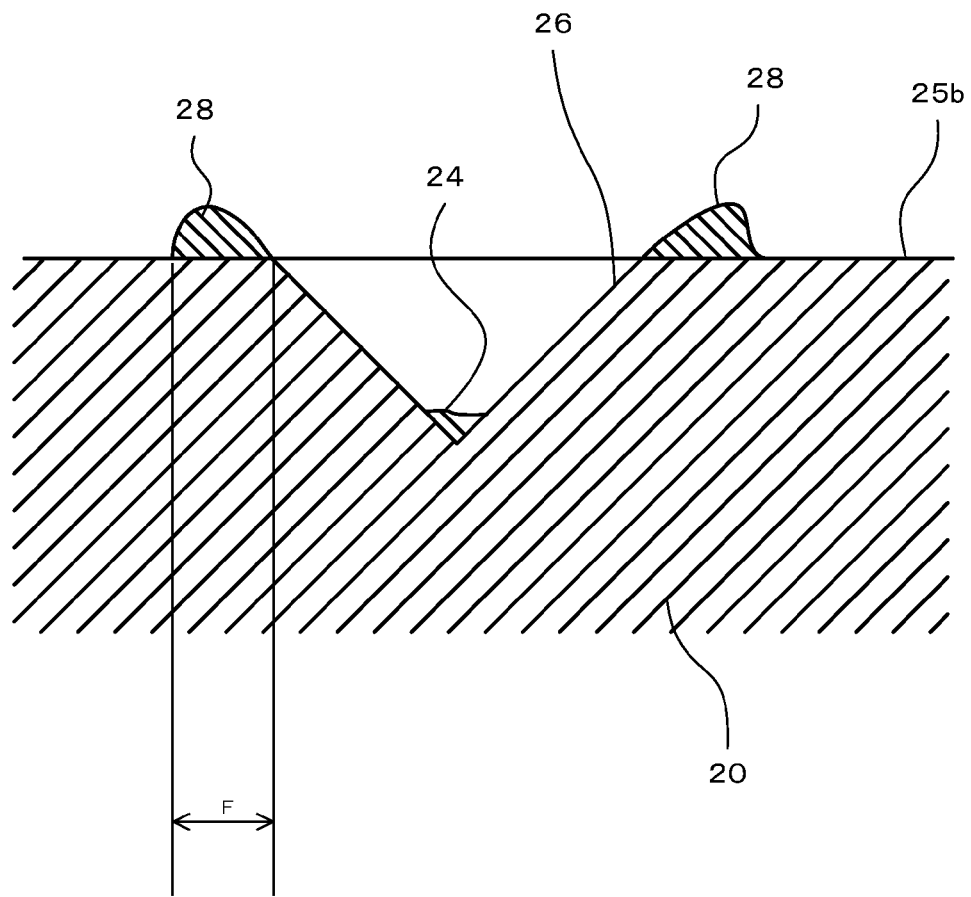
FIG. 8 is a cross sectional view of the light guide member 20 according to a third embodiment.

The light guide member 20 according to a third embodiment of the present invention will be described with reference to FIG. 8. FIG. 8 schematically shows a cross section of the dot-like recess 26 formed in the light guide member 20 according to the third embodiment.

The recess 26 according to the third embodiment differs from the recess 26 according to the first embodiment in that the protruding portions 28 raised from the surface of the main surface 25b are formed in the vicinity of the periphery of the recess 26. By forming the protruding portions 28 raised from the periphery of the recess 26, the light propagating toward the protruding portions 28 is diffused in a complex manner, so that, compared with the case where the periphery of the recess 26 is formed flat, a different diffusion state can be exhibited. The width F of the protruding portions 28 of the rectangular pyramidal recess 26 is not particularly limited. Preferably, however, the width F may be not less than ⅕ and not more than ½ the length of the side of the rectangular pyramid recess 26. In this way, the diffusion effect by the periphery of the recess 26 can be obtained. Preferably, the thickness of the protruding portions 28 may be not less than 50 µm and not more than 200 µm at the thickest portion.

The recess 26 may be manufactured by the following method. First, as shown in FIG. 9A, the mold 70 formed in a rectangular pyramidal convex shape is prepared. The mold 70 is then pressed down while thermal or ultrasound machining is performed, as shown in FIG. 9B so as to form the rectangular pyramidal recess 26 in the main surface 25b of the light guide member 20. Then, as shown in FIG. 9C, the molten material 27a is formed on the inner surfaces of the recess 26. As the mold 70 is further pressed down, some of the molten material 27a is pushed out in the vicinity of the periphery of the recess 26, whereby the raised protruding portions 28 are formed. Meanwhile, some of the molten material 27a flows into the deepest part of the recess 26. In this state, the molten material 27a is cured. The mold 70 is then released, allowing the remaining molten material 27a to also flow into the deepest part of the recess 26, i.e., the apex of the rectangular pyramid, where the molten material 27a is cured. Finally, as shown in FIG. 9D, the recess 26 is formed with the protruding portions 28 formed by some of the molten material 27a around the recess 26 and the bottom surface 24 formed by the remaining molten material 27a that has flowed into and been flowed back and cured in the deepest part of the recess 26.

In the light guide member manufactured as described above, in addition to the diffusion by the surface of the bottom surface 24 and by the boundary surface between the recess side surfaces 27 and the molten material 27a, irregular reflection is produced by the protruding portions 28, so that complex optical diffusion and refraction are generated. Thus, different impressions of light can be obtained, or the output efficiency of light through the output surface can be improved.

(Fourth Embodiment)

The light guide member 20 according to a fourth embodiment of the present invention will be described with reference to FIG. 10. FIG. 10 schematically shows a cross section of the dot-like recess 26 formed in the light guide member 20 according to the fourth embodiment.

The recess 26 according to the fourth embodiment differs from the recess 26 according to the above-described second embodiment in that, instead of the formation of the protruding portions 28 by the natural flow of the molten material, the recess 26 of the fourth embodiment is formed in a desired form.

Figure 10A:
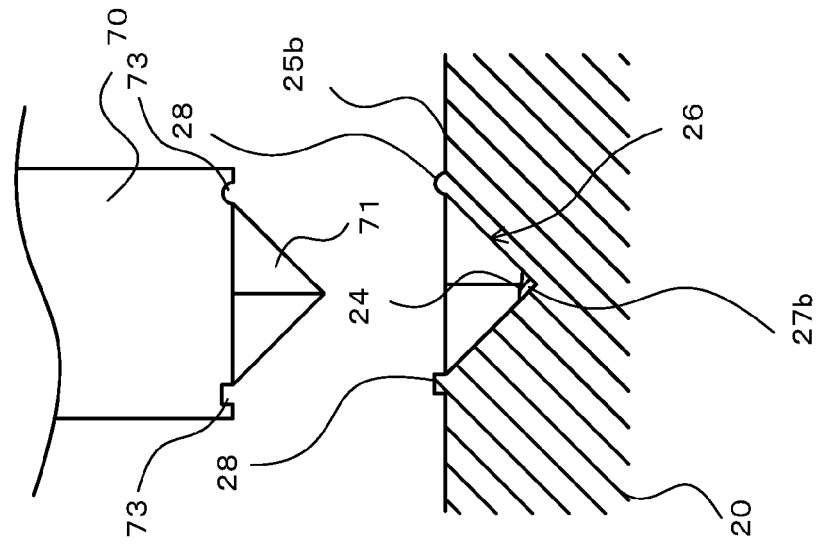
FIG. 10A schematically shows a process of forming the recess 26 in the light guide member 20 according to a fourth embodiment.
Figure 10B:
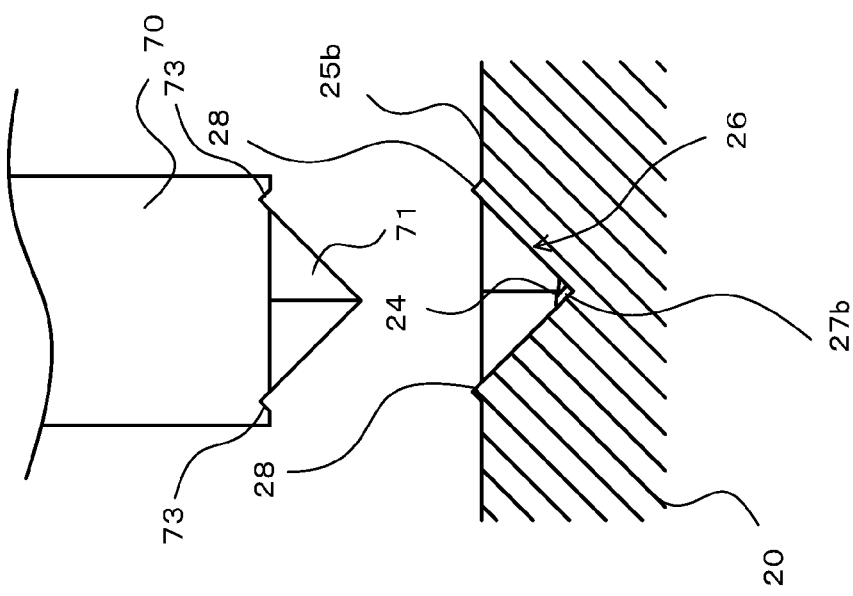
FIG. 10B schematically shows the process of forming the recess 26 in the light guide member 20 according to the fourth embodiment.

As shown in FIG. 10, the recess 26 according to the fourth embodiment differs in that protruding portion forming recesses 73 for forming the raised protruding portions 28 are formed around the convex portion 71 of the mold 70 in advance. When the recess 26 is made by using the mold 70 with the protruding portion forming recesses 73, the molten material is pushed out into the protruding portion forming recesses 73 and molded. Thus, the protruding portions 28 can be formed in the shape of the protruding portion forming recesses 73. In the example shown in FIG. 10A, the protruding portions 28 have a triangular cross section. In the example shown in FIG. 10B, the protruding portion 28 on the left has a rectangular cross section while the protruding portion 28 on the right has a semicircular cross section.

Thus, by modifying the shape of the protruding portions 28, the manner in which light is diffused at the protruding portions 28 can be modified, whereby the brightness of light around the recess can be varied.

(Fifth Embodiment)

FIG. 11 shows the recess 26 of the light guide member 20 according to a fifth embodiment of the present invention. FIG. 11 is a photograph taken from the main surface 25a on which the recess 26 is not formed.

The recess 26 of the light guide member 20 according to the fifth embodiment is obtained by forming a number of cracks in the protruding portions 28 made according to the third embodiment. The cracks can be produced by pressing a plate and the like onto the main surface of the light guide member 20 with the protruding portions 28, and thus lightly crushing the protruding portions 28. The cracks may also be produced by pressing the mold 70 after FIG. 9D in the method of manufacturing the protruding portions 28 according to the third embodiment. By forming a number of cracks in the protruding portions 28, more complex optical refraction and diffusion can be obtained.

(Sixth Embodiment)

Figure 12A:
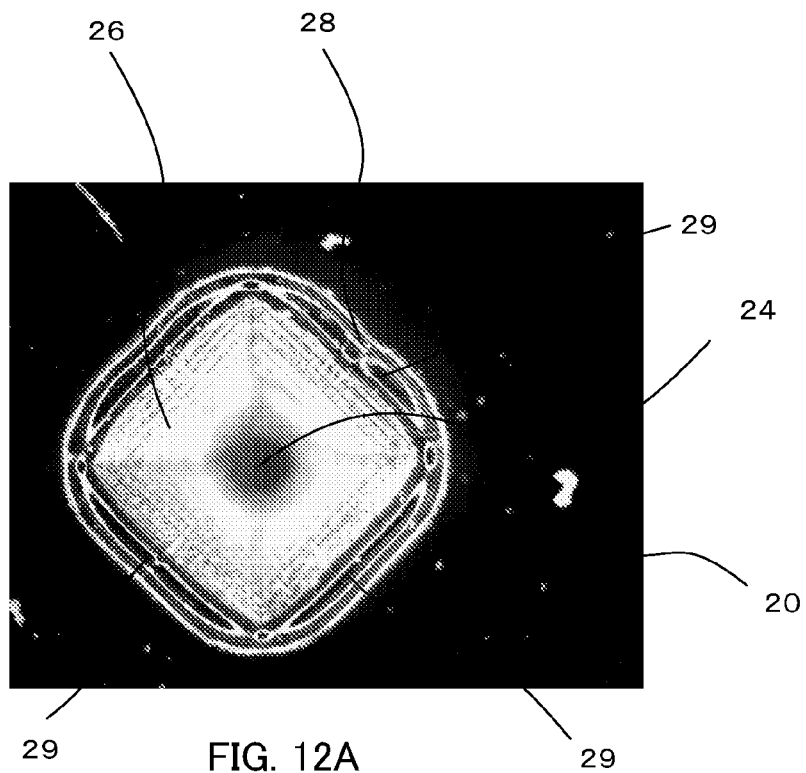
FIG. 12A shows a photograph of the recess in the light guide member 20 according to a sixth embodiment.
Figure 12B:
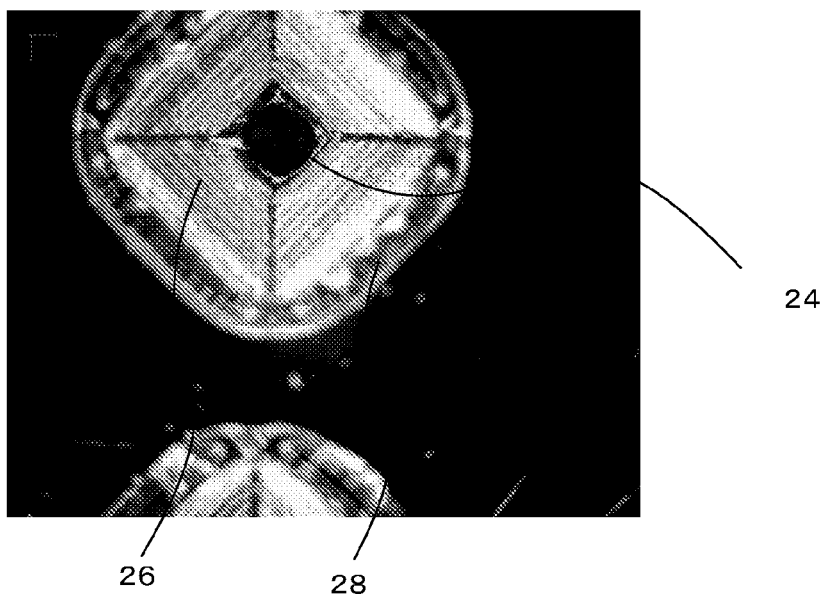
FIG. 12B shows a photograph of the recess in the light guide member 20 according to the sixth embodiment.

FIG. 12 shows the recess 26 of the light guide member 20 according to a sixth embodiment of the present invention. FIG. 12 shows photographs of the dot-like recesses 26 of rectangular pyramidal shape formed in the light guide member 20 according to a sixth embodiment, FIG. 12A being a photograph focused on the main surface 25b and FIG. 12B being a photograph focused on the bottom surface 24. The photographs of FIG. 12 are taken from the main surface 25*b* on which the recess is formed.

In the recess 26 of the light guide member 20 according to the sixth embodiment, air bubbles 29 are formed inside the protruding portions 28 around the recess 26. The air bubbles 29 are made by trapping air as the protruding portions 28 are formed and leaving the air inside the protruding portions 28. The recess 26 having the protruding portions 28 with the air bubbles can cause even more complex optical refraction and diffusion.

(Seventh Embodiment)

Figure 13:
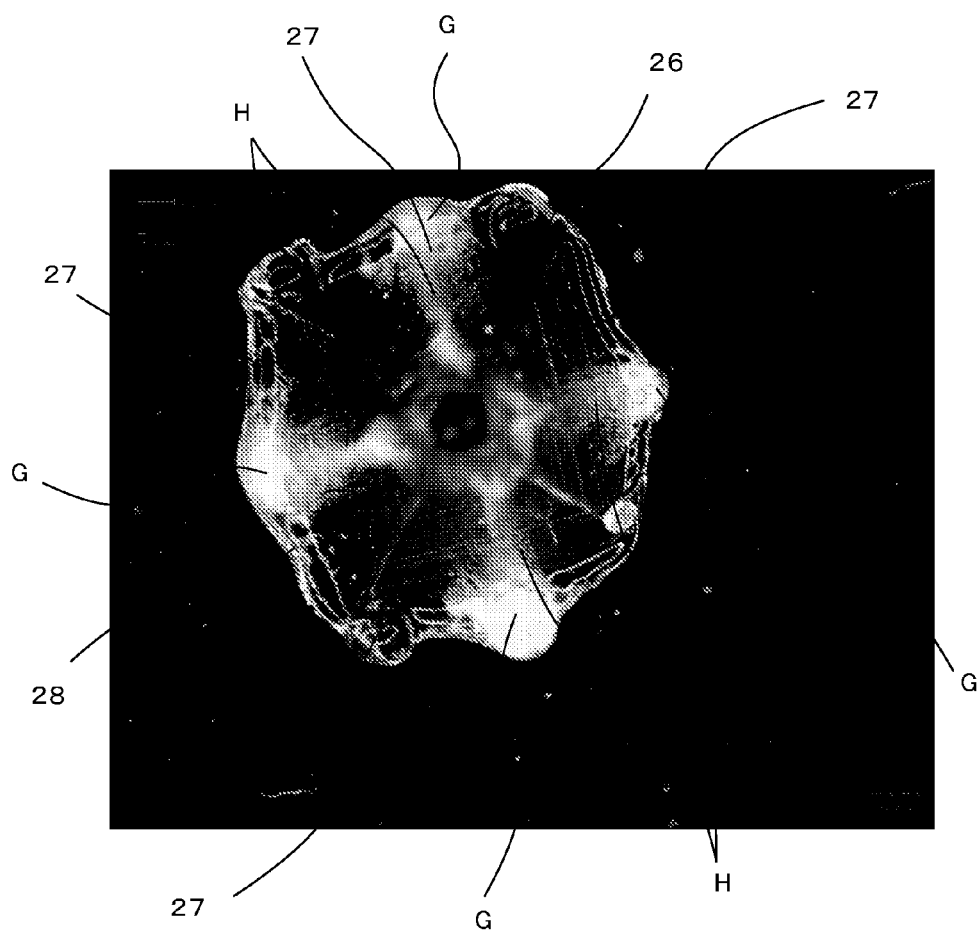
FIG. 13 shows a photograph of the recess in the light guide member 20 according to a seventh embodiment.

FIG. 13 shows the recess 26 of the light guide member 20 according to a seventh embodiment of the present invention. As shown in FIG. 13, in the recess 26 of the light guide member 20 according to the seventh embodiment, substantially the center of each of the protruding portions 28 formed at the sides of the rectangular opening of the recess 26 is raised (portions G in FIG. 13). The molten material 27*a* that has flowed from the raised parts between the adjacent sides of the rectangular pyramid is cured such that the recess side surfaces 27 are partly raised, thus forming the molten marks (portions H in FIG. 13). Thus, the light can be refracted or diffused in an even more complex manner at each of the recess side surfaces 27 of the rectangular pyramid.

(Eighth Embodiment)

Figure 14:
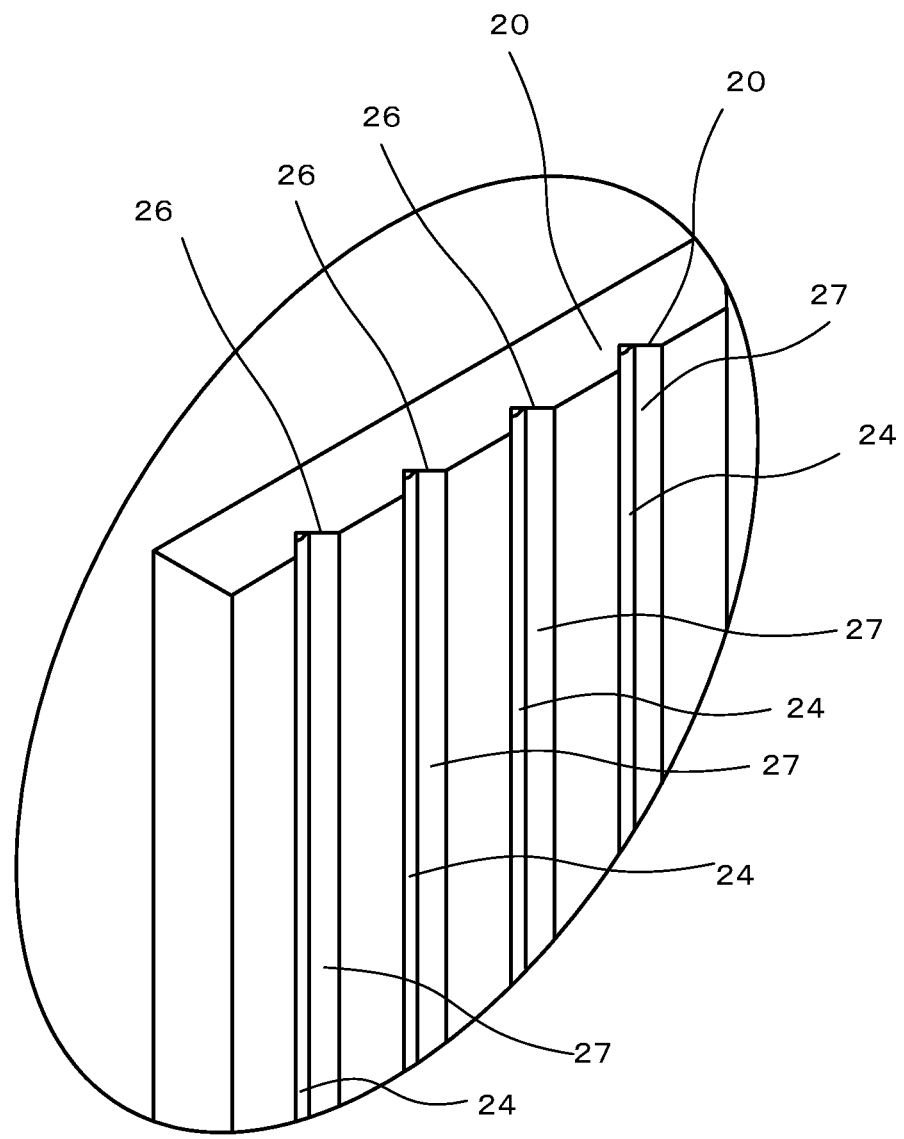
FIG. 14 is a perspective view of the recess in the light guide member 20 according to an eighth embodiment.

FIG. 14 shows the recess 26 of the light guide member 20 according to an eighth embodiment of the present invention. As shown in FIG. 14, in the recess 26 of the light guide member 20 according to the eighth embodiment, the groove-like recesses 26 are formed instead of the dot-like recesses. The groove-like recesses 26 include a number of long grooves with a generally substantially triangular cross section. As shown in FIG. 14, the groove-like recesses 26 include the bottom surfaces 24 at the deepest part (apex) of the grooves, which are formed by molten marks of molten material. The groove-like recesses 26 have a substantially trapezoidal cross section with the bottom surfaces 24 having different slopes with respect to the recess side surfaces 27 of the grooves. The surface of the bottom surfaces 24 of the grooves may also be formed in an uneven surface or a coarse surface as described above. In this way, the light that passes through the bottom surfaces 24 can be similarly randomly diffused, thus exhibiting diffusion states different from the groove-like recess side surfaces 27. The molten mark 27*b* may also be formed on the recess side surfaces 27 in addition to the bottom surfaces 24.

The present invention is not limited to the foregoing embodiments, and it should be understood that various modifications can be made within the technical scope of the present invention.

For example, while the light guide member 20 is in the form of a light guide plate according to the foregoing embodiments, the light guide member 20 may be a curved plate or a block member, such as a cube, in addition to a flat plate.

While according to the foregoing embodiments, the recesses 26 are formed only on one main surface 25*b* of the light guide member 20, the recesses 26 may be formed on both of the main surfaces 25*a* and 25*b*. In this case, the form of the recesses may be different between the sides, such as the recesses 26 of square frustum shape formed on one main surface and the recesses 26 of triangular frustum shape formed on the other main surface.

While in the foregoing embodiments the recesses 26 are manufactured by ultrasound machining, the recesses 26 may be formed by thermal machining.

INDUSTRIAL APPLICABILITY

As described in the foregoing embodiments, the present invention may be utilized as a light guide plate.

DESCRIPTION OF REFERENCE NUMERALS

11: Light source
12: Board
14: Holder member
20: Light guide member
24: Bottom surface
25*a*: Main surface
25*b*: Main surface
26: Recess
27: Recess side surface
27*a*: Molten material
27*b*: Molten mark
27*c*: Boundary
28: Protruding portion
29: Air bubble
30: Reflector
40: Display plate
70: Mold
71: Convex portion
73: Protruding portion forming recess
75: Air-cooling nozzle
100: Display apparatus

The invention claimed is:

1. A light guide member receiving light through one or more side surfaces and outputting the light through one or more main surfaces, the light guide member comprising recesses formed by a machine in at least one of the main surfaces in a groove-like or dot-like shape, wherein
   a molten mark is formed in at least a part of the recesses by the curing of a molten material, and
   a boundary surface is formed between side surfaces of the recesses and an outer surface of the molten mark.

2. The light guide member according to claim 1, wherein an upper surface of the molten mark forms a bottom surface of the recesses upon curing the molten material to form the molten mark.

3. The light guide member according to claim 1, wherein the molten mark is an uneven surface or a coarse surface.

4. The light guide member according to claim 1, wherein the molten mark has an area of not more than ⅕ the area of an opening of the recesses on the main surfaces of the light guide member.

5. The light guide member according to claim 1, wherein the molten mark is formed by the molten material melted from the light guide member when the recesses are formed.

6. The light guide member according to claim 1, wherein the recesses have a substantially triangular frustum shape, a substantially circular frustum shape, or a substantially rectangular frustum shape with the bottom surfaces formed by the molten mark made by being flowed back at a bottom of a substantially triangular pyramid, a substantial cone, or a substantially rectangular pyramid.

7. The light guide member according to claim 1, wherein:
   the recesses are formed by melting the main surfaces by pressing a mold for ultrasound machining or thermal machining having an inverted shape with respect to the shape of the recesses onto the main surfaces; and
   the bottom surfaces are formed by flowing some of the molten material melted from the main surfaces back into the deepest part of the recesses.

8. The light guide member according to claim 7, wherein:
the mold has an uneven shape formed on the surface of convex portions inverted with respect to the shape of the recesses; and
the side surfaces of the recesses having an uneven shape transferred from the uneven shape on the surface of the convex portions of the mold.

9. The light guide member according to claim 7, wherein:
the mold has a step-like uneven shape on the surface of the convex portions inverted with respect to the shape of the recesses; and
the side surfaces of the recesses having an uneven shape transferred from the step-like uneven shape of the surface of the convex portions of the mold.

10. The light guide member according to claim 7, wherein:
the mold has a step-like concentrically rectangular uneven shape on the surface of a convex portions inverted with respect to the shape of the recesses; and
the side surfaces of the recesses having an uneven shape transferred from the step-like concentrically rectangular uneven shape of the surface of the convex portions of the mold.

11. The light guide member according to claim 1, wherein protruding portions are formed to be raised from the main surfaces in the vicinity of the periphery of the recesses.

12. The light guide member according to claim 11, wherein:
the recesses are formed by melting the main surfaces by pressing a mold for ultrasound machining or thermal machining having an inverted shape with respect to the shape of the recesses onto the main surfaces;
the bottom surfaces are formed by flowing some of the molten material melted from the main surfaces back into the deepest part of the recesses; and
the protruding portions are formed by pushing out some of the molten material onto the periphery of the recesses.

13. The light guide member according to claim 11, wherein the protruding portions are formed by using a mold.

14. The light guide member according to claim 11, wherein the protruding portions have a plurality of internal cracks.

15. The light guide member according to claim 11, wherein the protruding portions have internal air bubbles.

16. A method of manufacturing a light guide member, comprising:
providing the light guide member, which receives light through one or more side surfaces and outputs the light through one or more main surfaces, the light guide member comprising recesses formed by a machine in at least one of the main surfaces in a groove-like or dot-like shape, wherein a molten mark is formed in at least a part of the recesses by the curing of a molten material;
manufacturing the recesses by melting the main surfaces by pressing an ultrasound machining mold having an inverted shape with respect to the shape of the recesses onto the main surfaces of the light guide member; and
forming a bottom surface by allowing some of the molten material to flow to an apex of the ultrasound machining mold so as to flow some of the molten material back, and then lifting the ultrasound machining mold after the bottom surface is formed by the curing of the molten material that has been flowed back.

17. The method of manufacturing the light guide member according to claim 16, further comprising forming protruding portions by pushing out the molten material onto the periphery of the recesses while forming the bottom surface.

* * * * *